June 18, 1935.  E. M. MENGE  2,005,467
FLOWER HOLDER
Filed Feb. 26, 1935   2 Sheets-Sheet 1
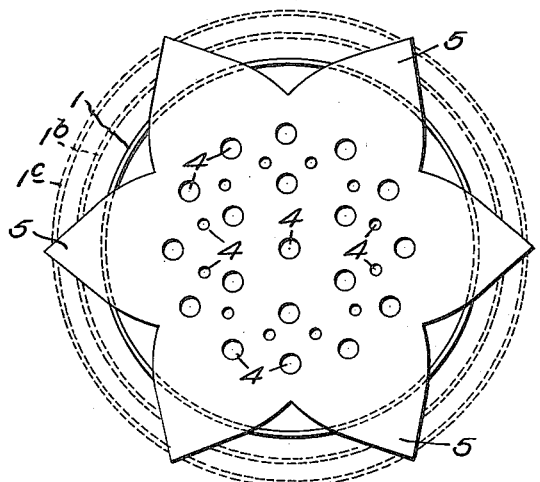
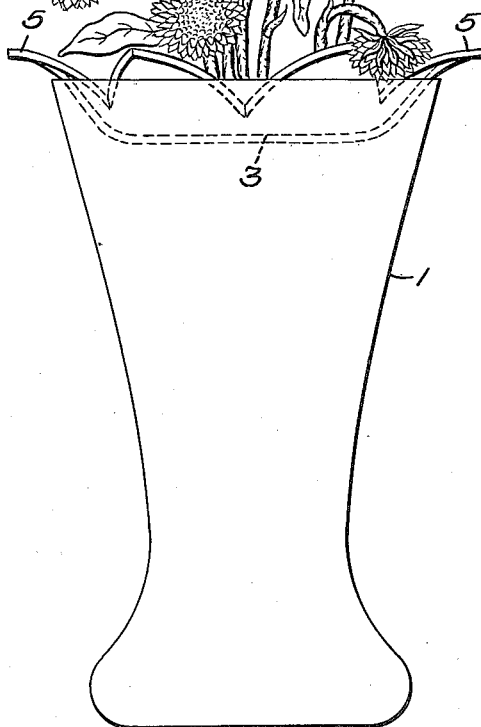
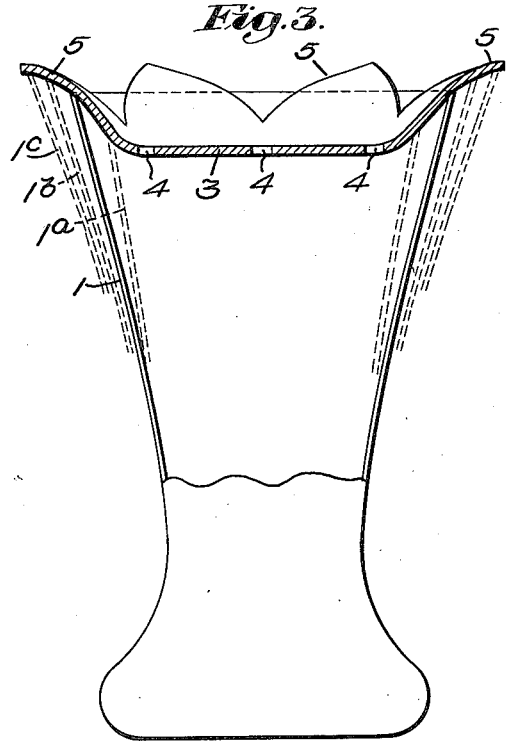
Inventor:
Emma M. Menge.

June 18, 1935.   E. M. MENGE   2,005,467
FLOWER HOLDER
Filed Feb. 26, 1935   2 Sheets-Sheet 2

Inventor:
Emma M. Menge,
By Emery, Booth, Varney and Townsend
Attys.

Patented June 18, 1935

2,005,467

UNITED STATES PATENT OFFICE 2,005,467

FLOWER HOLDER

Emma M. Menge, Newton, Mass.

Application February 26, 1935, Serial No. 8,285

4 Claims. (Cl. 47—41)

This invention relates to flower holders. In order that the principle of the invention may be readily understood, I have disclosed a single embodiment thereof in the accompanying drawings, wherein—

Fig. 1 is a side elevation of the flower holder in its position of use upon the upper edge of a vase or other flower container;

Fig. 2 is a plan view of the flower holder and the flower container, and in dotted lines a flower container of larger diameter is indicated;

Fig. 3 is a vertical section view, partly in side elevation, of the structure shown in Fig. 1, other containers of larger diameter being indicated in dotted lines;

I am aware that attempts have heretofore been made to provide flower holders of such a character that the stems thereof may be supported more or less individually but heretofore so far as I am aware such devices have either been an integral part of the container itself, or require a special construction of container, such, for example, as an inner bead or flange, or the device has rested upon the bottom of the container, or in the event that it has been used in a container having a flaring upper portion, the holder has been of such shape that it cannot readily be removed from position unless a special handle be provided. I am also aware that it has been proposed, as in the British patent to Turley, No. 13767/05 to provide a flower holder of general convex form to rest upon the upper edge of a flower bowl or receptacle, interengaging tubular extensions being provided upon the holder and the receptacle to retain the two parts in proper relative position.

Figure 4:
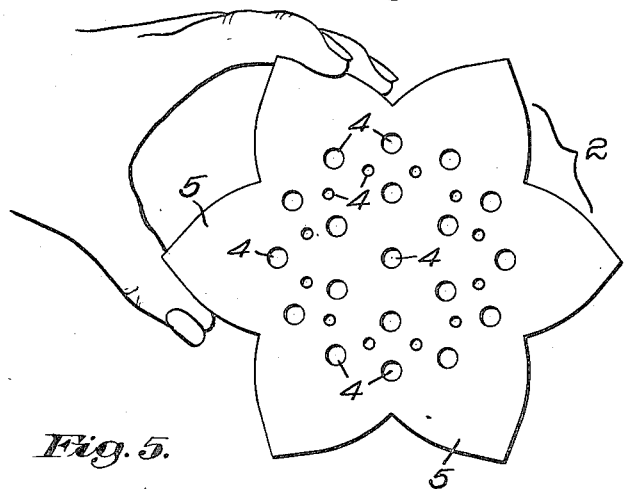
Fig. 4 is a plan view of the flower holder representing the same as grasped between the fingers and thumb which engage the opposite edges of two next adjacent leaf-like projections.
Figure 5:
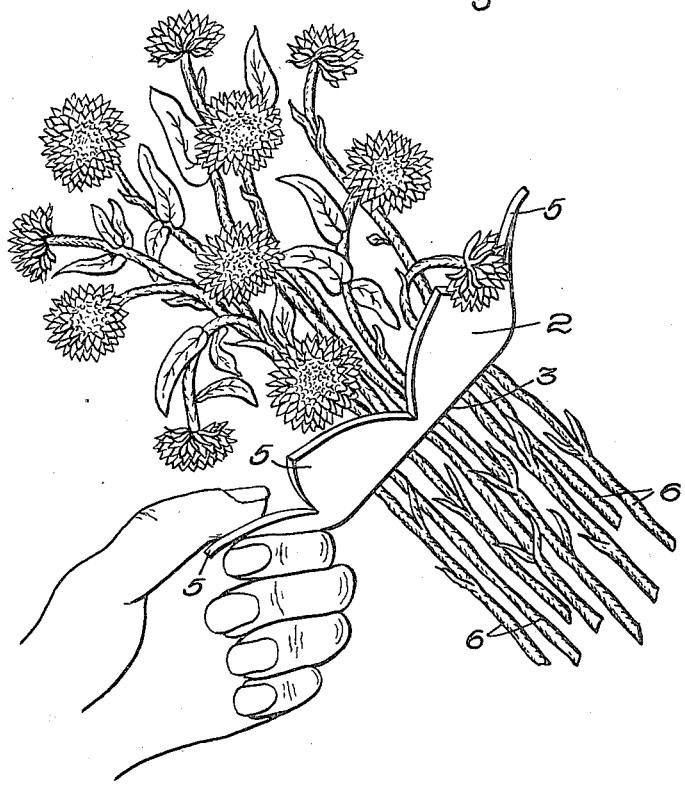
Fig. 5 is a perspective view showing how the flower holder may be grasped with the flowers in position in the holder, so that the stems may be conveniently washed or cut, etc.

The flower holder of my invention is distinguished from the prior art so far as I am aware of the same by reason of the fact (1) that it is of a general concaved shape with upwardly and outwardly, relatively broad, spaced formations which adapt the holder to be received and supported upon several and preferably four different diameters of receptacles, (2) that the holder is provided with a plurality of leaf-like projecting portions symmetrically disposed about its periphery, and (3) that it is provided at its periphery with portions which not only together serve to support the holder upon any one of several sizes of containers, but they, either singly as when used as in Fig. 5, or two next adjacent ones as in Fig. 4, serve as handles by which the flower holder may be readily taken off the container with all the flowers in place, and, without disturbing the flowers, may be readily tilted so that the stems thereof may be washed or cut. Other advantages will be set forth in the ensuing description.

Referring more particularly to the drawings, a receptacle for flowers is indicated at 1, in Figs. 1, 2 and 3. This, of course, forms no part of my invention, as an important feature of my invention is that the flower holder is adapted to be used with any one of several diameters of vases, jardinieres or other containers. At 1a, 1b and 1c in Fig. 3 and at 1a in Fig. 2, I have indicated in dotted lines the mouth portion of containers of larger diameters. The flower holder is represented as an entirety at 2 in the several views. I prefer to make the same of some firm waterproof material, and I may make the same of pyralin, beetleware, catalin, metal, treated wood or rubber. In some cases, it may be made of paper suitably treated and of proper weight and strength. I have found pyralin well adapted to the purpose as it may be readily stamped or molded into proper shape and may be cut to provide the special edge formation hereinafter referred to.

As shown most clearly in Figs. 3 and 5, the holder is of a general concave or saucer-like shape having a bottom or base portion 3 that is desirably flat or substantially so. It is provided at suitable intervals with a relatively large number of holes 4 which desirably are of graduated sizes so as to receive different sizes of stems, but if preferred the openings may be all of the same diameter. Preferably also the openings 4 are flush with the faces of the holder; that is to say, they do not have any projecting rim or portion or rough edge that might serve to injure the flower stems or prevent the very ready placing of the flower stems in the holder.

The holder is desirably not made with a circular perimeter but is provided with what I term leaf-like projecting portions which not only perform the important function of supporting the holder upon any one of several different sizes of containers as well as providing a very convenient handle portion for removing the holder from the container with all the flowers in place, but also they simulate leaves or the petals or sepals of flowers and in this way add to the attractiveness of the flower arrangement instead of detracting therefrom as might otherwise be the case.

The said leaf-like projections or formations are indicated at 5 in the several views. By referring to Fig. 4, it will be observed that two next adjacent leaf-like projections 5 may be readily grasped between two fingers and the thumb of one hand and firmly held, because the side edges of each projection 5 are at an acute angle to the circle defined by the base of all of said portions 5. This will be very evident from an inspection of Fig. 4. Or, if desired, one of the projections 5 may be readily grasped between the thumb and forefinger applied to the opposite faces of one projection 5, as shown in Fig. 5. Whether the flower holder be grasped as shown in Fig. 4 or as shown in Fig. 5, it may be held firmly with all the flowers in position therein, so that the stems 6 of the flowers may be washed or cut, or the water in the container may be changed without disturbing the arrangement of the flowers. It will be observed that the under face of the leaf-like projections 5 are broad and therefore each of them gives a substantial support upon the upper rim of the receptacle and all of the said projections 5, being symmetrically arranged, insure the firm supporting of the flower holder upon the receptacle. The lower faces of the said projections 5 also slope or flare upwardly and outwardly as clearly indicated in Figs. 1, 3 and 5, so as to provide a firm support whatever be the diameter of the mouth of the container, as is clearly evident from Fig. 3.

The number of the projections 5 will depend somewhat upon the size of the holder. When the holder is of a total diameter of about six to eight inches, or less, a total of six projections 5 has been found sufficient but in the case of larger diameters a greater number of projections 5 is desired. My invention, however, is not limited in this respect.

To show the adaptability of the flower holder of my invention to a large number of different containers, it may be noted that I may, for example, provide six different sizes or diameters of flower holders which among themselves are adapted to use upon, say, twenty-four different diameters of containers of standard sizes differing among themselves from one half inch to one inch in diameter. In other words, each flower holder is readily adapted to four different sizes of containers, as shown in Fig. 3. Within my invention the holder may be made of any size. It will be observed, however, that a comparatively small number of different diameters of holders are adapted to be used with a very large range of sizes of containers. For example, the flower holder of my invention may be readily made to be used upon containers which are as large as fifteen inches or so in diameter. On the other hand, the holders in the smaller sizes may be used upon containers of three or four inches diameter. I have pointed out that it is entirely unnecessary to remove the flowers from the holder so long as the flowers themselves are fresh enough for use or display, and inasmuch as the holder with the flowers therein may be readily removed from the container without in any wise injuring the stems, the life of the flowers is prolonged.

Obviously each holder is equally well adapted for use with a large number of flowers or only a few flowers, inasmuch as the device itself is of a graceful, ornamental shape and in no wise detracts from the appearance of the flowers themselves.

The concaved shape of the flower holder functions to give an increased support to the entire bouquet or group of flowers which in the case of a large bouquet may be important. Moreover, by reason of the concaved shape the base portion 3 of the holder is brought nearer to the surface of the water, and as hereinbefore stated the holder is supported in a more stable manner, entirely upon the rim of the container, and it is unnecessary that the container itself have an interrupted circular rim.

Having thus described my invention, it is to be understood that although specific terms are employed, they are used in a generic and descriptive sense and not for purposes of limitation, the scope of the invention being set forth in the following claims.

I claim:—

1. A flower holder of general concave or saucer-like shape and therefore adapted to be supported solely upon the upper rim of any conventional flower container, the mouth whereof is of a diameter less than the extreme diameter of the holder, said holder having a series of stem-receiving openings.

2. A flower holder provided with a base portion having stem-receiving openings therein and having its perimeter formed as a series of leaf-like projections each of which is relatively broad with acute angled edges, whereby the said holder may be supported by the lower faces of said projections upon different diameters of flower container.

3. A flower holder provided with a base portion having stem-receiving openings therein and having its perimeter formed as a series of leaf-like projections each of which is relatively broad with acute angled edges, whereby the said holder may be supported by the lower faces of said projections upon different diameters of flower container, the said holder as an entirety being of a concave or saucer-like shape.

4. A flower holder having a substantially flat base portion provided with a plurality of stem-receiving openings, thus providing smooth faces for said base portion, said holder at its periphery consisting of a series of symmetrically arranged leaf-like projections upwardly and outwardly sloping with parallel upper and lower faces and edges at acute angles, thereby providing a convenient handle formation permitting manipulation of the flower holder with the flower group in position with the stems extending through said openings.

EMMA M. MENGE.